(12) United States Patent
Bräuning et al.

(10) Patent No.: US 12,404,796 B2
(45) Date of Patent: Sep. 2, 2025

(54) EXHAUST-GAS TREATMENT ARRANGEMENT

(71) Applicant: Purem GmbH, Neunkirchen (DE)

(72) Inventors: Silas Bräuning, Denkendorf (DE);
Wolfgang Datz, Tuebingen (DE);
Markus Henzler, Grafenberg (DE);
Oleksandr Velyaev, Stuttgart (DE);
Tobias Wolf, Koengen (DE); Arthur Wieland, Baltmannsweiler (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/528,470

(22) Filed: Dec. 4, 2023

(65) Prior Publication Data
US 2024/0183305 A1 Jun. 6, 2024

(30) Foreign Application Priority Data
Dec. 5, 2022 (DE) ...................... 10 2022 132 127.4

(51) Int. Cl.
*F01N 13/00* (2010.01)
*B01F 25/30* (2022.01)
(Continued)

(52) U.S. Cl.
CPC ......... *F01N 13/009* (2014.06); *F01N 3/2066* (2013.01); *B01F 25/30* (2022.01);
(Continued)

(58) Field of Classification Search
CPC combination set(s) only.
See application file for complete search history.

(56) References Cited

U.S. PATENT DOCUMENTS

| 6,021,639 | A | * | 2/2000 | Abe | ...................... F01N 13/009 |
| | | | | | 60/303 |
| 2009/0000287 | A1 | * | 1/2009 | Blaisdell | ............. B01F 25/4323 |
| | | | | | 60/324 |

(Continued)

FOREIGN PATENT DOCUMENTS

| DE | 11 2009 000 706 T5 | 5/2011 |
| DE | 10 2013 205 297 A1 | 7/2014 |

(Continued)

*Primary Examiner* — Binh Q Tran
(74) *Attorney, Agent, or Firm* — Walter Ottesen, P.A.

(57) ABSTRACT

An exhaust-gas treatment arrangement for an exhaust system of an internal-combustion engine includes a diesel internal-combustion engine. The arrangement includes a first exhaust-gas treatment unit and, downstream of the first exhaust-gas treatment unit, an exhaust-gas treatment assembly. The first exhaust-gas treatment unit and the exhaust-gas treatment assembly are arranged axially succeeding one another in the direction of a longitudinal axis of a flow path encompassing the first exhaust-gas treatment unit and the exhaust-gas treatment assembly. A hydrocarbon-feeding assembly is provided for feeding hydrocarbon into exhaust gas flowing in the flow path. The hydrocarbon-feeding assembly includes a hydrocarbon-dispensing unit dispensing hydrocarbon into the flow path downstream of the first (Continued)

exhaust-gas treatment unit and upstream of the exhaust-gas treatment assembly. A swirl-flow-generating unit is provided in the flow path upstream of the hydrocarbon-dispensing unit.

17 Claims, 3 Drawing Sheets

(51) Int. Cl.
| | |
|---|---|
| *B01F 25/31* | (2022.01) |
| *B01F 25/41* | (2022.01) |
| *B01F 25/42* | (2022.01) |
| *B01F 25/441* | (2022.01) |
| *B01F 27/50* | (2022.01) |
| *B01F 27/86* | (2022.01) |
| *B01F 27/92* | (2022.01) |
| *F01N 1/08* | (2006.01) |
| *F01N 3/20* | (2006.01) |

(52) U.S. Cl.
CPC ............ *B01F 25/311* (2022.01); *B01F 25/41* (2022.01); *B01F 25/42* (2022.01); *B01F 25/44166* (2022.01); *B01F 27/50* (2022.01); *B01F 27/861* (2022.01); *B01F 27/92* (2022.01); *F01N 1/086* (2013.01); *F01N 2240/20* (2013.01); *F01N 2330/38* (2013.01); *F01N 2610/03* (2013.01)

(56) References Cited

U.S. PATENT DOCUMENTS

| | | | |
|---|---|---|---|
| 2009/0158717 A1* | 6/2009 | Kimura | F01N 13/08 60/299 |
| 2011/0088375 A1* | 4/2011 | Suzuki | B01F 25/312 60/295 |
| 2011/0107749 A1* | 5/2011 | Tsujimoto | F01N 13/08 60/297 |
| 2013/0247545 A1 | 9/2013 | Solbrig et al. | |
| 2014/0041370 A1* | 2/2014 | Solbrig | F01N 3/0253 60/295 |
| 2014/0318112 A1* | 10/2014 | Solbrig | F01N 3/208 60/324 |
| 2024/0183297 A1* | 6/2024 | Brauning | F01N 3/0253 |
| 2024/0183299 A1* | 6/2024 | Brauning | F01N 13/009 |

FOREIGN PATENT DOCUMENTS

| | | |
|---|---|---|
| DE | 10 2020 007 553 A1 | 3/2021 |
| EP | 2 290 204 A1 | 3/2011 |
| JP | 2006-183509 A | 7/2006 |
| JP | 4502800 B2 | 7/2010 |

* cited by examiner

EXHAUST-GAS TREATMENT ARRANGEMENT

CROSS-REFERENCE TO RELATED APPLICATIONS

This application claims priority of German patent application no. 10 2022 132 127.4, filed Dec. 5, 2022, the entire content of which is incorporated herein by reference.

TECHNICAL FIELD

The present disclosure relates to an exhaust-gas treatment arrangement for an exhaust system of an internal-combustion engine, in particular a diesel internal-combustion engine.

BACKGROUND

For the purpose of attaining the permissible exhaust-gas values of the exhaust gases emitted by internal-combustion engines, in particular by diesel internal-combustion engines, it is known, for instance, to inject a reagent such as, for example, a urea/water solution into the exhaust gas, in order to lower the content of nitrogen oxide in an exhaust-gas treatment unit taking the form, in particular, of an SCR catalytic-converter unit. It is also known to combine various types of catalytic converter, such as, for example, SCR catalytic-converter units and oxidation catalytic-converter units, in an exhaust-gas treatment arrangement of such a type, in order to obtain a diminution that is as efficient as possible of the pollutant content in the exhaust gas emitted to the environment.

For the catalytic reactions to be carried out in various system regions of an exhaust-gas treatment arrangement of such a type, it is necessary that the catalyst materials that are active for this purpose have a sufficiently high temperature. Since the heat transported in the exhaust gas is often not sufficient, particularly in start-up phases of the working operation of an internal-combustion engine or at comparatively low ambient temperatures, to attain quickly or to maintain reliably a sufficiently high temperature for the catalytic reactions to be carried out, it is, for instance, known to integrate electrically operated exhaust-gas heaters into an exhaust system, in order to transfer heat to the exhaust gas emitted by an internal-combustion engine, or to a different gas fed into the exhaust system, upstream of one or more catalytically active system regions, which is then transported by the exhaust gas, or by the gas, to the catalytically active system region(s) and transferred thereto.

SUMMARY

It is an object of the present disclosure to provide an exhaust-gas treatment arrangement for an exhaust system of an internal-combustion engine, in particular a diesel internal-combustion engine, with which, with a structurally simple and compact configuration, a reliable heating of system regions provided for the purpose of exhaust-gas treatment can be guaranteed.

In accordance with the disclosure, this object is, for example, achieved via an exhaust-gas treatment arrangement for an exhaust system of an internal-combustion engine, in particular a diesel internal-combustion engine, including at least one first exhaust-gas treatment unit and, downstream of the at least one first exhaust-gas treatment unit, an exhaust-gas treatment assembly, wherein the at least one first exhaust-gas treatment unit and the exhaust-gas treatment assembly are arranged axially succeeding one another in the direction of a longitudinal axis of a flow path encompassing the at least one first exhaust-gas treatment unit and the exhaust-gas treatment assembly, wherein a hydrocarbon-feeding assembly has been provided for the purpose of feeding hydrocarbon into exhaust gas flowing in the flow path, wherein the hydrocarbon-feeding assembly includes a hydrocarbon-dispensing unit, for dispensing hydrocarbon into the flow path downstream of the at least one first exhaust-gas treatment unit and upstream of the exhaust-gas treatment assembly, and a swirl-flow-generating unit in the flow path upstream of the hydrocarbon-dispensing unit.

By virtue of the provision of the hydrocarbon-feeding assembly constructed in accordance with the disclosure, the possibiiity is created of feeding hydrocarbon releasing heat in the course of its oxidation and consequently contributing to the heating of system regions provided for the purpose of exhaust-gas treatment—that is, for instance, the fuel that is also to be supplied to an internal-combustion engine—into the stream of exhaust gas, and of efficiently intermixing it with exhaust gas. In particular, the swirl-flow-generating unit positioned in the flow path upstream of the location of the feeding of the hydrocarbon into the flow path, which transmits a peripheral-flow-direction component to the stream of exhaust gas flowing in the flow path, contributes to the efficient intermixing of exhaust gas and hydrocarbon, so that a flow-direction component in the peripheral direction is superimposed on a main flow direction of exhaust gas in the flow path which is oriented substantially in the direction of the longitudinal axis of the flow path. This results in occurrences of swirling, and basically in a longer flow path between the at least one first exhaust-gas treatment unit and the exhaust-gas treatment assembly, which is available and is utiiized for the purpose of intermixing exhaust gas and hydrocarbon.

The hydrocarbon-dispensing unit may be supported on a flow-path housing axially between an outlet region of the at least one first exhaust-gas treatment unit and an inlet region of the exhaust-gas treatment assembly, so that the hydrocarbon-dispensing unit can be accommodated in the exhaust-gas treatment arrangement without basically protruding beyond the outer contour thereof.

For the purpose of further assisting the efficient intermixing of exhaust gas and hydrocarbon, the hydrocarbon-dispensing unit for dispensing hydrocarbon may have been arranged with a main dispensing direction substantially orthogonal to the longitudinal axis of the flow path or oriented substantially tangentially with respect to the longitudinal axis of the flow path.

For the purpose of generating the swirl current, the swirl-flow-generating unit may include a plurality of current-deflecting elements.

For an efficient and compact configuration of the swirl-flow-generating unit, the current-deflecting elements may have been arranged succeeding one another in the peripheral direction about the longitudinal axis of the flow path, or/and they may have been arranged extending substantially radially with respect to the longitudinal axis of the flow path, or/and they may have been arranged in a star-like configuration.

For a stable configuration, there may be provision that the swirl-flow-generating unit includes a ring-like body supported on the flow path, and the current-deflecting elements adjoin the ring-like body in their radial outer end region, or/and that the current-deflecting elements adjoin one another in their radial inner end region, or/and that the swirl-flow-generating unit takes the form of a sheet-metal formed part.

For a compact configuration of the exhaust-gas treatment arrangement, particularly in the axial direction, the swirl-flow-generating unit may have been arranged on an outlet region of the at least one first exhaust-gas treatment unit.

For the purpose of further lessening the pollutant component contained in the exhaust gas emitted by an internal-combustion engine, at least one second exhaust-gas treatment unit may have been arranged downstream of the exhaust-gas treatment assembly.

In order to be able to carry out a catalytic cleanup reaction efficiently in the at least one second exhaust-gas treatment unit, an exhaust-gas/reagent mixing section with a mixing duct elongated substantially in the direction of a longitudinal axis of the mixing section and with a reagent-dispensing unit for dispensing reagent into the mixing duct may have been provided downstream of the exhaust-gas treatment assembly and upstream of the at least one second exhaust-gas treatment unit.

For a compact configuration of the exhaust-gas treatment arrangement, it is proposed that the longitudinal axis of the mixing section is substantially parallel to the longitudinal axis of the flow path, or/and that the flow path and the exhaust-gas/reagent mixing section overlap one another substantially completely in the axial direction, so that an inlet region of the exhaust-gas/reagent mixing section in the direction of the longitudinal axis of the mixing section is positioned substantially in the same axial region as an outlet region of the exhaust-gas treatment assembly, and an outlet region of the exhaust-gas/reagent mixing section in the direction of the longitudinal axis of the mixing section is positioned substantially in the same axial region as an outlet region of the at least one first exhaust-gas treatment unit.

An efficient utilization of the construction volume provided for the exhaust-gas treatment arrangement can be obtained if a main flow direction of exhaust gas in the mixing duct is directed substantially contrary to a main flow direction of exhaust gas in the flow path.

Furthermore, for this purpose the at least one second exhaust-gas treatment unit may be elongated in the direction of a longitudinal axis of the exhaust-gas treatment unit, which is substantially parallel to the longitudinal axis of the flow path, and may be capable of being flowed through substantially in the direction of the longitudinal axis of the exhaust-gas treatment unit, and the at least one second exhaust-gas treatment unit and the exhaust-gas/reagent mixing section may overlap one another substantially completely in the axial direction, so that the inlet region of the exhaust-gas/reagent mixing section in the direction of the longitudinal axis of the mixing section is positioned substantially in the same axial region as an outlet region of the at least one second exhaust-gas treatment unit, and the outlet region of the exhaust-gas/reagent mixing section in the direction of the longitudinal axis of the mixing section is positioned substantially in the same axial region as an inlet region of the at least one second exhaust-gas treatment unit.

For the purpose of providing a flow connection, the inlet region of the exhaust-gas/reagent mixing section may have been connected to the outlet region of the exhaust-gas treatment assembly via a first current-deflecting housing, and the outlet region of the exhaust-gas/reagent mixing section may have been connected to the inlet region of the at least one second exhaust-gas treatment unit via a second current-deflecting housing.

For an increase in the efficiency of exhaust-gas treatment with a compact style of construction, at least two second exhaust-gas treatment units that are capable of being flowed through parallel to one another may have been provided at right angles to the longitudinal axis of the exhaust-gas treatment unit, alongside one another and overlapping one another substantially completely in the direction of the longitudinal axis of the exhaust-gas treatment unit.

At least one exhaust-gas treatment unit may include at least one SCR catalytic-converter unit or/and at least one ammonia-blocking catalytic-converter unit. Furthermore, the exhaust-gas treatment assembly may include an oxidation catalytic-converter unit or/and a particle-filter unit.

For the most uniform possible feeding of exhaust gas intermixed with hydrocarbon over the cross-section of the exhaust-gas treatment assembly, a flow-distribution element may have been arranged in the flow path downstream of the hydrocarbon-dispensing unit and upstream of the exhaust-gas treatment assembly.

The flow-distribution element may, for instance, take the form of a sheet-metal formed part in the manner of a plate, and may cover an inlet region of the exhaust-gas treatment assembly substantially completely. A large number of flow-through openings may have been provided in the flow-distribution element. These flow-through openings may have been formed with substantially the same cross-section for a uniform feeding of exhaust gas or hydrocarbon into the exhaust-gas treatment assembly, and may have been distributed substantially uniformly over the flow-distribution element.

The disclosure further relates to an exhaust system for an internal-combustion engine, in particular a diesel internal-combustion engine, including at least one exhaust-gas treatment arrangement constructed in accordance with the disclosure.

BRIEF DESCRIPTION OF DRAWINGS

The invention will now be described with reference to the drawings wherein.

DETAILED DESCRIPTION

Figure 1:
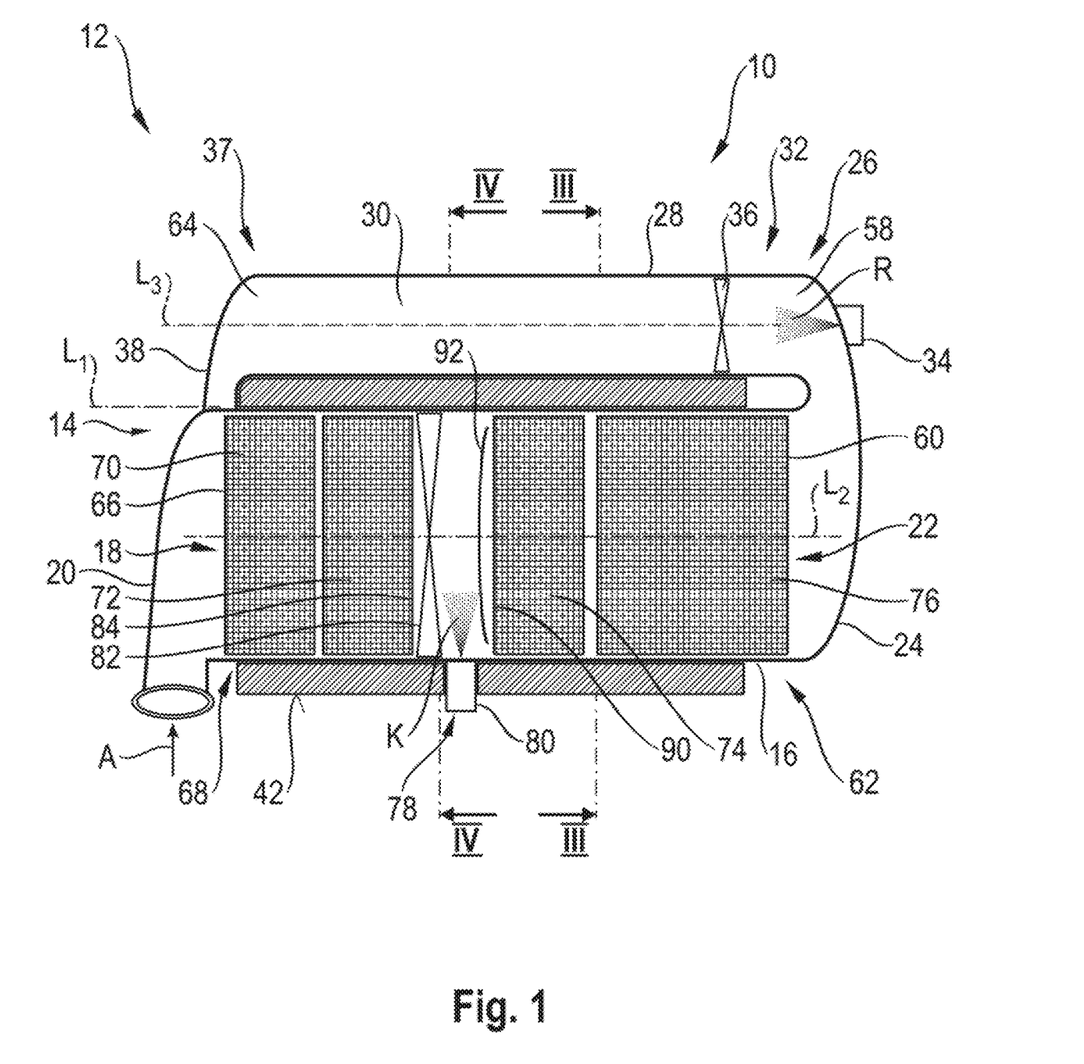
FIG. 1 shows a side view, represented partially open, of an exhaust-gas treatment unit for an internal-combustion engine.
Figure 2:
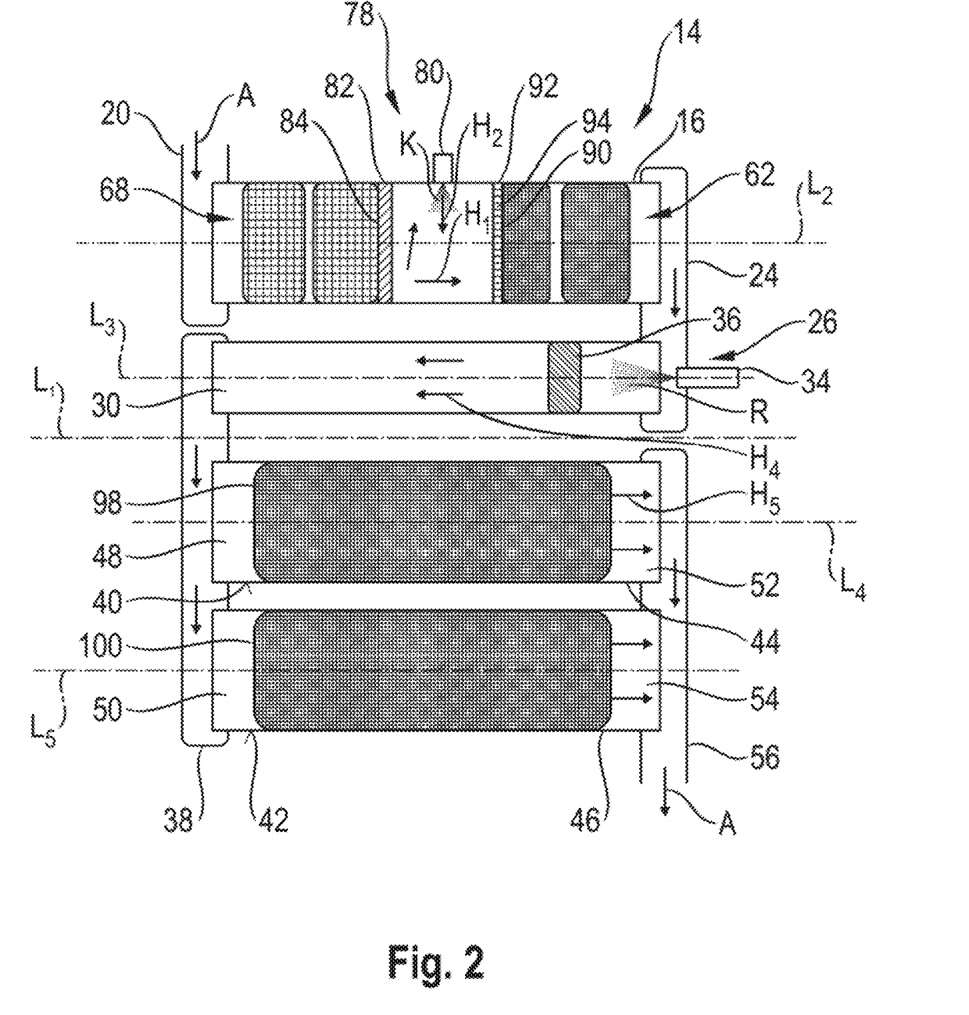
FIG. 2 shows, in schematic and developed representation, the system regions of the exhaust-gas treatment arrangement shown in FIG. 1, succeeding one another in the direction of flow and overlapping one another substantially axially.
Figure 3:
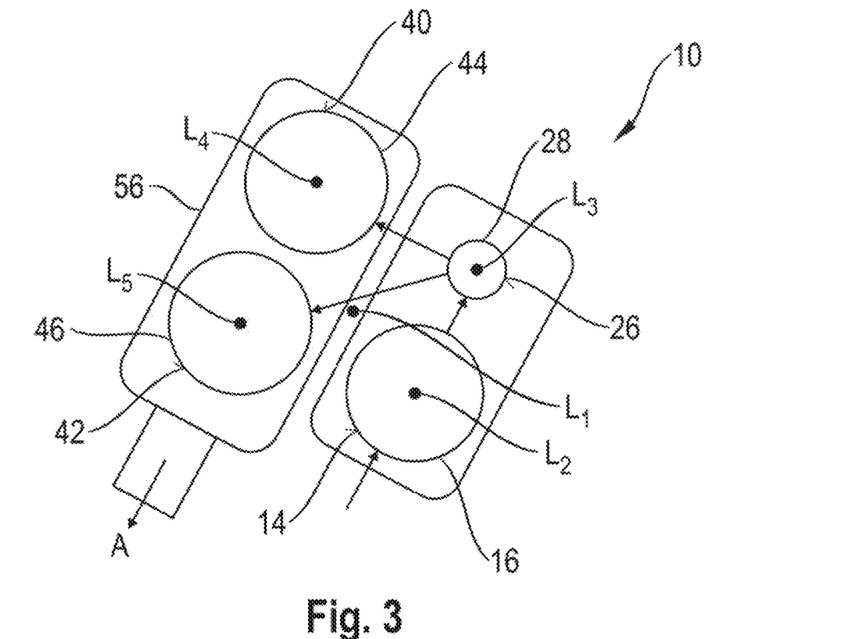
FIG. 3 shows a schematic cross-sectional view of the exhaust-gas treatment arrangement shown in FIG. 1, cut along a line III-III in FIG. 1; and, FIG. 4 shows a perspective cross-sectional view of the exhaust-gas treatment arrangement shown in FIG. 1, cut along a line IV-IV in FIG. 1.

In FIG. 1 an exhaust-gas treatment arrangement 10 for an exhaust system 12, in particular for a diesel internal-combustion engine, can be discerned in side view. An exhaust-gas treatment arrangement 10 of such a type may, for instance, have been provided in an exhaust system 12 of a utility motor vehicle or of a truck. In FIGS. 2 and 3 the exhaust-gas treatment arrangement 10 is represented in schematic view, FIG. 2 representing a peripheral embodiment of the exhaust-gas treatment arrangement 10, basically elongated in the direction of a longitudinal axis $L_1$ of the exhaust-gas treatment arrangement.

The exhaust-gas treatment arrangement 10 includes a flow path, denoted generally by 14 and elongated in the direction of a longitudinal axis $L_2$ of the flow path, with a substantially tubular flow-path housing 16 which is in one piece or composed of several parts. At an upstream end region 18 of the flow path 14 a feed housing 20 adjoins the flow-path housing 16. Exhaust gas A emitted by an internal-combustion engine is fed into the exhaust-gas treatment arrangement 10, or into the flow path 14, via the feed housing 20. In a downstream end region 22 of the flow path 14 a first deflecting housing 24 adjoins the flow-path housing 16. In the first deflecting housing 24 the exhaust gas A flowing through, or emerging from, the flow path 14 is deflected by approximately 180° and fed into an exhaust-gas/reagent mixing section 26. The exhaust-gas/reagent mixing section 26 includes, in a tubular mixing-section housing 28, a mixing duct 30 elongated in the direction of a longitudinal axis $L_3$ of the mixing section. At an upstream end region 32 of the exhaust-gas/reagent mixing section 26 a reagent-dispensing unit 34, also generally designated as an injector, has been provided, supported, for instance, on the first deflecting housing 24, through which a reagent R, for instance a urea/water solution, is injected into the mixing duct 30. For the purpose of assisting the intermixing of exhaust gas A and reagent R, a mixer 36, including, for instance, a plurality of deflecting blades or such like, may have been arranged in the mixing-section housing 28.

In a downstream end region 37 of the exhaust-gas/reagent mixing section 26 the mixing-section housing 28 adjoins a second deflecting housing 38. In the second deflecting housing 38 a deflection of the stream of exhaust gas by approximately 180° again takes place. In the embodiment represented, the exhaust gas is fed via the second deflecting housing 38 into two second exhaust-gas treatment units 40, 42 which are capable of being flowed through parallel to one another. Each of the second exhaust-gas treatment units 40, 42 includes a tubular exhaust-gas treatment-unit housing 44, 46 elongated in the direction of a respective longitudinal axis $L_4$, $L_5$ of the exhaust-gas treatment unit. A respective upstream end region of the exhaust-gas treatment-unit housings 44, 46 provides a respective inlet region 48, 50 of the second exhaust-gas treatment units 40, 42, and a respective downstream end region of the exhaust-gas treatment-unit housings 44, 46 provides a respective outlet region 52, 54 of the second exhaust-gas treatment units 40, 42. These are open to a drainage housing 56 via which the exhaust gas A treated in the exhaust-gas treatment arrangement 10 leaves the exhaust-gas treatment arrangement 10 to reach further system regions of the exhaust system 12, for instance one or more mufflers or such like.

FIGS. 1 and 3 show that in the exhaust-gas treatment arrangement 10 the flow path 14, the exhaust-gas/reagent mixing section 26 and the second exhaust-gas treatment units 40, 42 are positioned in such a manner that longitudinal axes $L_2$, $L_3$, $L_4$, $L_5$ thereof are substantially parallel to one another and to the longitudinal axis $L_1$ of the exhaust-gas treatment arrangement, and that they overlap one another substantially completely in the axial direction. This means that an inlet region 58 of the exhaust-gas/reagent mixing section 26 is situated substantially in the same axial region as an outlet region 60 of an exhaust-gas treatment assembly 62 arranged in the flow path 14, and that an outlet region 64 of the exhaust-gas/reagent mixing section 26 is situated substantially in the same axial region as an inlet region 66 of a first exhaust-gas treatment unit 68 arranged in the flow path 14. Equally, the outlet region 64 of the exhaust-gas/reagent mixing section 26 is situated substantially in the same axial region as the inlet regions 48, 50 of the second exhaust-gas treatment units 40, 42, whereas the inlet region 58 of the exhaust-gas/reagent mixing section 26 is situated substantially in the same axial region as the outlet regions 52, 54 of the second exhaust-gas treatment units 40, 42.

In the embodiment represented, the first exhaust-gas treatment unit 68 arranged in the flow path 14, or in the flow-path housing 16, includes an SCR catalytic-converter unit 70 and an ammonia-blocking catalytic-converter unit 72, succeeding one another in the direction of flow or axially in the direction of the longitudinal axis $L_2$ of the flow path. The exhaust gas A, fed into the flow path 14 via the feed housing 20, flows through the two catalytic-converter units 70, 72 of the first exhaust-gas treatment unit 68 substantially in a main flow direction $H_1$ of exhaust gas in the flow path 14, the main flow direction $H_1$ of exhaust gas in the flow path 14 being oriented substantially parallel to the longitudinal axis $L_2$ of the flow path. Of course, flow-direction components deviating from this main flow direction $H_1$ of exhaust gas may be present, for instance in regions in which occurrences of swirling or turbulence arise. In the exhaust system 12 a further reagent-dispensing unit may have been arranged upstream of the exhaust-gas treatment arrangement 10 or of the SCR catalytic-converter unit 70, in order to feed a reagent, for instance a urea/water solution, into the stream of exhaust gas upstream of the SCR catalytic-converter unit 70.

Downstream of the two catalytic-converter units 70, 72 of the first exhaust-gas treatment unit 68 an oxidation catalytic-converter unit 74, in particular a diesel oxidation catalytic-converter unit, and a particle-filter unit 76 of the exhaust-gas treatment assembly 62 are arranged, succeeding one another in the direction of flow. The exhaust gas A flowing through the flow path 14 flows substantially in the main flow direction $H_1$ of exhaust gas, firstly through the oxidation catalytic-converter unit 74 and then through the particle-filter unit 76, before it is deflected by the first deflecting housing 24 in the direction toward the exhaust-gas/reagent mixing section 26.

Attention is drawn to the fact that in the case of the exhaust-gas treatment arrangement 10 both the first exhaust-gas treatment unit 68 and the exhaust-gas treatment assembly 62 may have been constructed differently than in the embodiment represented. For instance, the first exhaust-gas treatment unit 68 might include only the SCR catalytic-converter unit 70. The exhaust-gas treatment assembly 62 might, for instance, include only the oxidation catalytic-converter unit 74.

The exhaust-gas treatment arrangement 10 includes, assigned to the flow path, a hydrocarbon-feeding assembly denoted generally by 78. This assembly includes a hydrocarbon-dispensing unit 80, also generally designated as an injector, which is positioned on the flow-path housing 16 axially between the at least one first exhaust-gas treatment unit 68 and the exhaust-gas treatment assembly 62.

The hydrogen-dispensing unit 80 inputs hydrocarbon K—for instance, the fuel also used in an internal-combustion engine—in the form of a spray mist or in droplet form into the flow path 14 in a region downstream of the at least one first exhaust-gas treatment unit 68 and upstream of the exhaust-gas treatment assembly 62. In this process, the hydrocarbon K can be fed into the flow path 14 with a main dispensing direction $H_2$, discernible in FIG. 2, which is oriented substantially orthogonally or tangentially to the longitudinal axis $L_2$ of the flow path—that is, it may have a peripheral-orientation component.

The hydrocarbon-feeding assembly 78 further includes a swirl-flow-generating unit 82 downstream of the first exhaust-gas treatment unit 68, in particular covering an outlet region 84 thereof. This swirl-flow-generating unit 82, discernible in FIG. 4, may take the form, for instance, of a sheet-metal formed part and may include a plurality of current-deflecting elements 86 extending substantially radially with respect to the longitudinal axis $L_2$ of the flow path. The current-deflecting elements 86 may have been formed in the swirl-flow-generating unit 82 as axial moldings, between which openings 96 extending substantially radially, for instance slit-like openings, have been formed. In the region of these openings 96 the exhaust gas flowing through the first exhaust-gas treatment unit 68 is able to flow into the region of the flow path 14 into which the hydrocarbon K is fed. In a radially outer region, the current-deflecting elements 86 adjoin a ring-like body 88 of the swirl-flow-generating unit 82, with which the latter can be supported, for instance on the inner periphery of the flow-path housing 16 or at the downstream end of the at least one first exhaust-gas treatment unit 68. The current-deflecting elements 86 adjoin one another radially on the inside, so that a basically very stable structure of the swirl-flow-generating unit 82, taking the form, for instance, of a sheet-metal formed part, is obtained.

Figure 4:
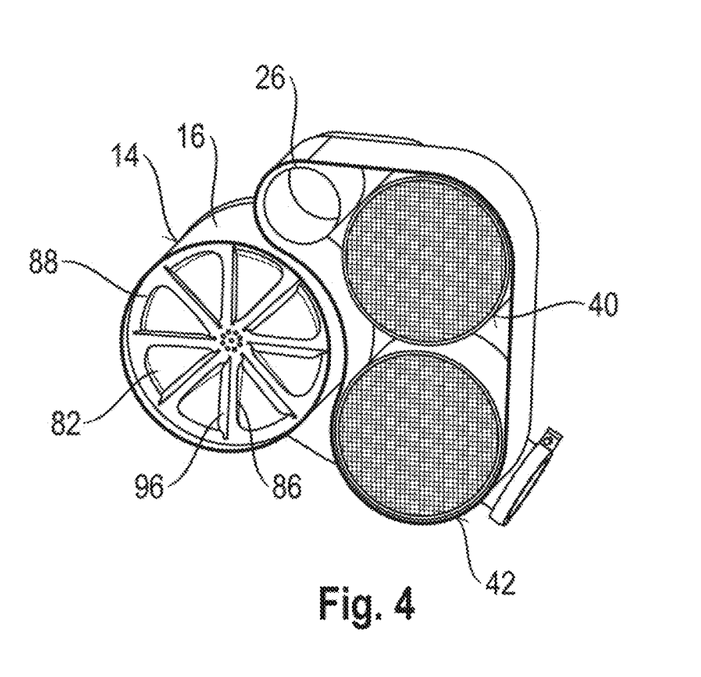

The current-deflecting elements 86 provide deflecting surfaces positioned with respect to the longitudinal axis $L_2$ of the flow path, which deflect the exhaust gas emerging from the first exhaust-gas treatment unit 68 substantially in the main flow direction $H_1$ of exhaust gas in the peripheral direction, so that this exhaust gas has a peripheral-flow-direction component superimposed on the main flow direction $H_1$ of exhaust gas. The hydrocarbon K is injected into this swirl current of the exhaust gas A by the hydrocarbon-dispensing unit 80 and is consequently carried along by the swirl current to the current in the peripheral direction or even in the axial direction. As a result, an efficient intermixing of hydrocarbon K and exhaust gas A is obtained in the flow path in the volume region between the outlet region 84 of the first exhaust-gas treatment unit 68 and an inlet region 90 of the exhaust-gas treatment assembly 62.

In order to obtain a feeding that is as uniform as possible of the exhaust gas A permeated with hydrocarbon K into the exhaust-gas treatment assembly 62, in particular into the oxidation catalytic-converter unit 74, a plate-like flow-distribution element 92 is arranged upstream of the exhaust-gas treatment assembly 62, covering an inlet region 90 of the same substantially completely. This flow-distribution element 92, taking the form, for instance, of a sheet-metal formed part, is perforated—that is, it exhibits a large number of flow-through openings 94 through which the mixture including exhaust gas A and hydrocarbon K enters the exhaust-gas treatment assembly 62, in particular the oxidation catalytic-converter unit 74. The flow-through openings 94 are distributed substantially uniformly over the surface of the flow-distribution element 92 and have substantially identical opening cross-sections relative to one another.

By oxidation of the hydrocarbon K transported in the exhaust gas A in the oxidation catalytic-converter unit 74, heat is released which, on the one hand, contributes to a heating of the oxidation catalytic-converter unit 74 and consequently ensures that the latter is quickly brought to an operating temperature required for the catalytic reaction, or is efficiently maintained at this temperature. On the other hand, some of this heat can be carried by the exhaust gas flowing through the oxidation catalytic-converter unit 74 to the following system regions, in particular to the exhaust-gas/reagent mixing section 26 and to the second exhaust-gas treatment units 40, 42. In the exhaust-gas/reagent mixing section 26 this can contribute to an intensified evaporation of the reagent R injected in liquid form. In the second exhaust-gas treatment units 40, 42, respective SCR catalytic-converter units 98, 100 of the same can be efficiently heated and brought to the temperature required for the SCR reaction more quickly, or can be maintained at this temperature.

With the structure, according to the disclosure, of an exhaust-gas treatment assembly, it is ensured, on the one hand by the admixture of hydrocarbon into the stream of exhaust gas, and on the other hand by an efficient intermixing of the hydrocarbon with the exhaust gas flowing in the exhaust-gas treatment assembly, that as a result of oxidation of the hydrocarbon, distributed over a large area, heat that is capable of being utilized for heating various system regions of the exhaust-gas treatment arrangement 10 provided for the purpose of carrying out catalytic reactions can be released substantially uniformly. By virtue of the integration of the hydrocarbon-feeding assembly into the flow path in the manner described in the foregoing, a compact configuration of the exhaust-gas treatment arrangement is obtained or retained, in which the flow principle is guaranteed, namely that the main flow direction $H_1$ of exhaust gas in the flow path, also encompassing the hydrocarbon-feeding assembly, is directed substantially contrary to a main flow direction $H_4$ of exhaust gas in the exhaust-gas/reagent mixing section, whereas a main flow direction $H_5$ of exhaust gas in the second exhaust-gas treatment units is directed to be identical to the main flow direction $H_1$ of exhaust gas in the flow path but is directed contrary to the main flow direction $H_4$ of exhaust gas in the exhaust-gas/reagent mixing section. Hence it can be guaranteed that, with an axially very compact style of construction, by reason of the feeding of hydrocarbon and by reason of the efficient intermixing of the hydrocarbon with the exhaust gas the statutory limiting values for pollutant contents in the exhaust gas can be attained or maintained under highly diverse operating circumstances of an internal-combustion engine or of the exhaust system.

It is understood that the foregoing description is that of the preferred embodiments of the invention and that various changes and modifications may be made thereto without departing from the spirit and scope of the invention as defined in the appended claims.

The invention claimed is:

1. An exhaust-gas treatment arrangement for an exhaust gas system of an internal combustion engine including a diesel internal combustion engine, the exhaust-gas treatment arrangement defining a flow path and comprising: a first exhaust-gas treatment unit;
    an exhaust-gas treatment assembly downstream of said first exhaust-gas treatment unit;
    said first exhaust-gas treatment unit and said exhaust-gas treatment assembly being arranged axially one after the other in a direction of a longitudinal axis ($L_2$) of said flow path with said flow path including said first exhaust-gas treatment unit and said exhaust-gas treatment assembly;
    a hydrocarbon feeding assembly for introducing hydrocarbon into exhaust gas flowing in said flow path;
    said hydrocarbon feeding assembly including a hydrocarbon-dispensing unit for dispensing hydrocarbon into said flow path downstream of said first exhaust-gas treatment unit and upstream of said exhaust-gas treatment assembly;
    a swirl-flow-generating unit arranged in said flow path upstream of said hydrocarbon-dispensing unit;

a second exhaust-gas treatment unit arranged downstream of said exhaust-gas treatment assembly; and, an exhaust-gas/reagent mixing section defining a longitudinal axis ($L_3$) and having a mixing duct elongated substantially in a direction of said longitudinal axis ($L_3$) of the mixing section; said exhaust-gas/reagent mixing section further having a reagent-dispensing unit for dispensing reagent into said mixing duct and being disposed downstream of said exhaust-gas treatment assembly and upstream of said second exhaust-gas treatment unit.

2. The exhaust-gas treatment arrangement of claim 1, further comprising a flow-path housing accommodating said flow path therein; and, said hydrocarbon-dispensing unit being supported on said flow-path housing axially between an outlet region of said first exhaust-gas treatment unit and an inlet region of said exhaust-gas treatment assembly.

3. The exhaust-gas treatment arrangement of claim 2, wherein said hydrocarbon-dispensing unit is arranged with a main dispensing direction ($H_2$) which is substantially orthogonal to said longitudinal axis ($L_2$) of said flow path or oriented substantially tangentially with respect to said longitudinal axis ($L_2$) of said flow path.

4. The exhaust-gas treatment arrangement of claim 1, wherein said swirl-flow-generating unit includes a plurality of current-deflecting elements.

5. The exhaust-gas treatment arrangement of claim 4, wherein at least one of the following applies:
  i) said current-deflecting elements are arranged succeeding one another in a peripheral direction about said longitudinal axis ($L_2$) of said flow path; and,
  ii) said current-deflecting elements are arranged extending substantially radially with respect to said longitudinal axis ($L_2$) of said flow path; and,
  iii) said current-deflecting elements are arranged in a star-like configuration.

6. The exhaust-gas treatment arrangement of claim 4, wherein said swirl-flow-generating unit includes a ring-like body supported on said flow path; and, wherein at least one of the following applies:
  i) said current-deflecting elements adjoin said ring-like body in a radial outer end region thereof; and,
  ii) said current-deflecting elements adjoin one another in a radial inner end region thereof; and,
  iii) said swirl-flow-generating unit assumes the form of a sheet-metal formed part.

7. The exhaust-gas treatment arrangement of claim 1, wherein said swirl-flow-generating unit is arranged on an outlet region of said first exhaust-gas treatment unit.

8. The exhaust-gas treatment arrangement of claim 1, wherein at least one of the following applies:
  i) said longitudinal axis ($L_3$) of said mixing section is substantially parallel to said longitudinal axis ($L_2$) of said flow path; and,
  ii) said flow path and said exhaust-gas/reagent mixing section overlap one another substantially completely in axial direction, so that an inlet region of the exhaust-gas/reagent mixing section in said direction of said longitudinal axis ($L_3$) of said mixing section is positioned substantially in a same axial region as an outlet region of said exhaust-gas treatment assembly; and,
  iii) an outlet region of said exhaust-gas/reagent mixing section in said direction of said longitudinal axis ($L_3$) of said mixing section is positioned substantially in a same axial region as an inlet region of said first exhaust-gas treatment unit.

9. The exhaust-gas treatment arrangement of claim 1, wherein a main flow direction ($H_4$) of exhaust gas in said mixing duct is directed substantially opposite to a main flow direction ($H_1$) of exhaust gas in the flow path.

10. The exhaust-gas treatment arrangement of claim 1, wherein said second exhaust-gas treatment unit is elongated in a direction of a longitudinal axis ($L_4$, $L_5$) of said exhaust-gas treatment unit which is substantially parallel to said longitudinal axis ($L_2$) of said flow path and is configured to be flowed through substantially in the direction of the longitudinal axis ($L_4$, $L_5$) of said second exhaust-gas treatment unit; and, said second exhaust-gas treatment unit and said exhaust-gas/reagent mixing section overlap one another substantially completely in an axial direction, so that an inlet region of said exhaust-gas/reagent mixing section is positioned in said direction of the longitudinal axis ($L_3$) of said mixing section substantially in a same axial region as an outlet region of said second exhaust-gas treatment unit, and an outlet region of said exhaust-gas/reagent mixing section is positioned in a direction of said longitudinal axis ($L_3$) of said mixing section substantially in the same axial region as an inlet region of said second exhaust-gas treatment unit.

11. The exhaust-gas treatment arrangement of claim 10, wherein said inlet region of said exhaust-gas/reagent mixing section is connected to the outlet region of said exhaust-gas treatment assembly via a first current-deflecting housing, and the outlet region of the exhaust-gas/reagent mixing section is connected to the inlet region of said second exhaust-gas treatment unit via a second current-deflecting housing.

12. The exhaust-gas treatment arrangement of claim 10, further comprising an additional second exhaust gas treatment unit to provide two second exhaust-gas treatment units, which are configured to be flowed through parallel to one another, and are provided transverse to the longitudinal axis ($L_4$, $L_5$) of the second exhaust-gas treatment units, alongside one another and overlapping one another substantially completely in the direction of the longitudinal axis ($L_4$, $L_5$) of the second exhaust-gas treatment units.

13. The exhaust-gas treatment arrangement of claim 1, wherein at least one of said exhaust-gas treatment units includes at least one SCR catalytic-converter unit and/or at least one ammonia-blocking catalytic-converter unit and/or wherein said exhaust-gas treatment assembly includes an oxidation catalytic-converter unit and/or a particle-filter unit.

14. The exhaust-gas treatment arrangement of claim 1, further comprising a flow-distribution element arranged in said flow path downstream of the hydrocarbon-dispensing unit and upstream of said exhaust-gas treatment assembly.

15. The exhaust-gas treatment arrangement of claim 14, wherein said flow-distribution element is formed in the manner of a plate and covers an inlet region of said exhaust-gas treatment assembly substantially completely, wherein a plurality of flow-through openings are formed with substantially the same cross-section and substantially uniformly distributed over the flow-distribution element, are provided in the flow-distribution element.

16. The exhaust-gas treatment arrangement of claim 15, wherein said flow-through openings are formed with substantially the same cross-section and substantially uniformly distributed over the flow-distribution element.

17. An exhaust system for an internal-combustion engine including a diesel internal-combustion engine, the exhaust system comprising:
  an exhaust-gas conduit conducting exhaust gas away from the combustion engine; and, an exhaust-gas treatment arrangement communicating with said exhaust-gas conduit and defining a flow path and said exhaust-gas treatment arrangement including:

a first exhaust-gas treatment unit;

an exhaust-gas treatment assembly downstream of said first exhaust-gas treatment unit;

said first exhaust-gas treatment unit and said exhaust-gas treatment assembly being arranged axially one after the other in a direction of a longitudinal axis ($L_2$) of said flow path with said flow path including said first exhaust-gas treatment unit and said exhaust-gas treatment assembly;

a hydrocarbon feeding assembly for introducing hydrocarbon into exhaust gas flowing in said flow path;

said hydrocarbon feeding assembly including a hydrocarbon-dispensing unit for dispensing hydrocarbon into said flow path downstream of said first exhaust-gas treatment unit and upstream of said exhaust-gas treatment assembly;

a swirl-flow-generating unit arranged in said flow path upstream of said hydrocarbon-dispensing unit;

a second exhaust-gas treatment unit arranged downstream of said exhaust-gas treatment assembly; and an exhaust-gas/reagent mixing section defining a longitudinal axis ($L_3$) and having a mixing duct elongated substantially in a direction of said longitudinal axis ($L_3$) of the mixing section; said exhaust-gas/reagent mixing section further having a reagent-dispensing unit for dispensing reagent into said mixing duct and being disposed downstream of said exhaust-gas treatment assembly and upstream of said second exhaust-gas treatment unit.

* * * * *